United States Patent
Zinn

[11] Patent Number: 5,707,112
[45] Date of Patent: Jan. 13, 1998

[54] LINEAR RECLINER WITH MEMORY SEATBACK DUMP MECHANISM

[75] Inventor: Marshal Duane Zinn, Waterford, Mich.

[73] Assignee: Magna Lomason Corporation, Farmington Hills, Mich.

[21] Appl. No.: 642,478

[22] Filed: May 3, 1996

[51] Int. Cl.$^6$ .................. B60N 2/02; B60N 2/22
[52] U.S. Cl. .................. 297/378.14; 297/362.14; 297/376
[58] Field of Search .................. 297/362.14, 378.1, 297/378.12, 362.12, 375, 376

[56] References Cited

U.S. PATENT DOCUMENTS

| | | | |
|---|---|---|---|
| 3,001,821 | 9/1961 | Marechal | 297/375 |
| 3,328,076 | 6/1967 | Naef. | |
| 3,635,525 | 1/1972 | Magyar. | |
| 3,736,025 | 5/1973 | Ziegler et al.. | |
| 3,957,312 | 5/1976 | Bonnaud. | |
| 4,065,178 | 12/1977 | Carella et al.. | |
| 4,394,047 | 7/1983 | Beunelle | 297/376 |
| 4,502,730 | 3/1985 | Kazaoka et al.. | |
| 4,660,886 | 4/1987 | Terada et al.. | |
| 4,799,733 | 1/1989 | Beley et al.. | |
| 4,822,101 | 4/1989 | Hosoe. | |
| 4,881,775 | 11/1989 | Rees. | |
| 4,898,424 | 2/1990 | Bell. | |
| 4,925,228 | 5/1990 | Pipon et al.. | |
| 5,052,752 | 10/1991 | Robinson. | |
| 5,269,588 | 12/1993 | Kunz et al.. | |
| 5,301,569 | 4/1994 | Droulon | 297/375 |
| 5,390,981 | 2/1995 | Griswold. | |
| 5,393,123 | 2/1995 | Hernandez et al.. | |

FOREIGN PATENT DOCUMENTS 1178225  1/1970  United Kingdom .................. 297/375

*Primary Examiner*—Peter M. Cuomo
*Assistant Examiner*—Anthony D. Barfield
*Attorney, Agent, or Firm*—Cushman Darby & Cushman IP Group of Pillsbury Madison & Sutro LLP

[57] ABSTRACT

A seat recliner having a linear recliner mechanism and a dump mechanism is disclosed. The linear retractor device is provided for adjusting the reclined position of the seatback. The dump mechanism includes a bracket mounted to the seat bottom which has a pair of elongated guide slots formed in two sidewall portions thereof. A carriage is slidably mounted in the elongated guide slots of the bracket and is coupled to the linear retractor mechanism for permitting sliding movement thereof between a memory position and a free position relative to the bracket. A latch device is provided for releasably securing the linear retractor mechanism in the memory position. When secured in its memory position, linear recliner mechanism can be selectively actuated to adjust the reclined position of the seatback between upright and fully-reclined positions. When the latch device is actuated, the linear retractor mechanism can be slid toward its free position in response to movement of the seatback toward its dumped position. Return of seatback from its dumped position causes linear recliner mechanism to again be secured in its memory position so as to locate and retain the seatback in its previously reclined position.

20 Claims, 5 Drawing Sheets

LINEAR RECLINER WITH MEMORY SEATBACK DUMP MECHANISM

BACKGROUND OF THE INVENTION

1. Field of the Invention

This invention relates generally to seat recliners of the type used in motor vehicles for adjusting the angular position of the seatback between an upright position and a fully reclined position. More particularly, a seat recliner equipped with a seatback dump mechanism is disclosed which allows the seatback to be moved to a forwardly dumped position and subsequently returned to its previous reclined position.

2. Description of Background Art

As is widely known, most motor vehicles are equipped with front seat assemblies having a reclinable seatback for providing increased comfort to the seat occupants. Typically, such reclinable seat assemblies include a seat recliner which can be actuated by the seat occupant for selectively adjusting the angular position of the seatback relative to the seat bottom between an upright position and a fully reclined position. In two-door vehicles, it is also common to provide the front seat assemblies with a seatback dump mechanism which can be actuated for pivoting the seatback to a forward "dumped" position to provide better access to the rear seating area of the motor vehicle.

In some instances, the seat recliner is released in response to actuation of the seatback dump mechanism for permitting the seatback to move its dumped position. However, upon the seatback being returned from its dumped position, the seat recliner automatically locks the seatback in a predefined position, typically the upright position. Thus, the seat recliner must again be released to reset the seatback in the preferred reclined position. To eliminate the need to readjust the reclined position of the seatback, some seat recliners further include a "memory" feature which operates to automatically return the seatback to its previous reclined position following return of the seatback from its dumped position. While a variety of such memory devices are currently available, most are relatively complex and expensive. Thus, a continuing need exists to develop alternative seat recliners which provide the memory feature in an arrangement that is simple in construction and less expensive to produce.

SUMMARY OF THE INVENTION

It is an object of the present invention to provide a seat recliner for use in a seat assembly having a seatback and a seat bottom, the seat recliner being equipped with a linear recliner mechanism and a dump mechanism which are operable to permit selective reclining and dumping movement of the seatback and allow the seatback to latch in its previously selected reclined position following return thereof from its dumped position.

It is a further object of the present invention to provide a dump mechanism that is operable in a latched mode for holding the linear recliner mechanism in a memory position relative to the seat bottom whereat the linear recliner mechanism can be selectively actuated for adjusting the reclined position of the seatback, and in an unlatched mode for permitting sliding movement of the linear recliner mechanism relative to the seat bottom which results in forward pivotable movement of the seatback toward its dumped position.

It is yet another object of the present invention to provide the seat recliner with a linear recliner mechanism that is normally operable in a locked mode for inhibiting reclining movement of the seatback and which can be selectively shifted into a released mode for permitting reclining movement of the seatback.

It is another object of the present invention to provide a seat recliner which is simple in structure, inexpensive to manufacture, easy to mass produce and durable in use.

These and other objects of the present invention are obtained by providing a seat recliner adapted to pivotally interconnect a seatback to a seat bottom and which is comprised of: a linear recliner mechanism operable for permitting selective adjustment of the reclined position of the seatback between an upright position and a fully-reclined position; and a dump mechanism operable for forwardly dumping the seatback, the dump mechanism including a pivot bracket adapted for mounting to the seat bottom and having a pair of elongated guide slots formed in two sidewall portions thereof, a carriage assembly slidably mounted in the elongated guide slots of the pivot bracket and which supports the linear retractor mechanism for sliding movement between a first position and a second position, and a latch assembly operable in a latched mode for releasably securing the carriage assembly in the first position when reclining movement of the seatback is desired, and in an unlatched mode for releasing the carriage assembly for movement toward the second position when forward dumping of the seatback is desired.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein.

DETAILED DESCRIPTION OF THE PREFERRED EMBODIMENTS

Figure 3:
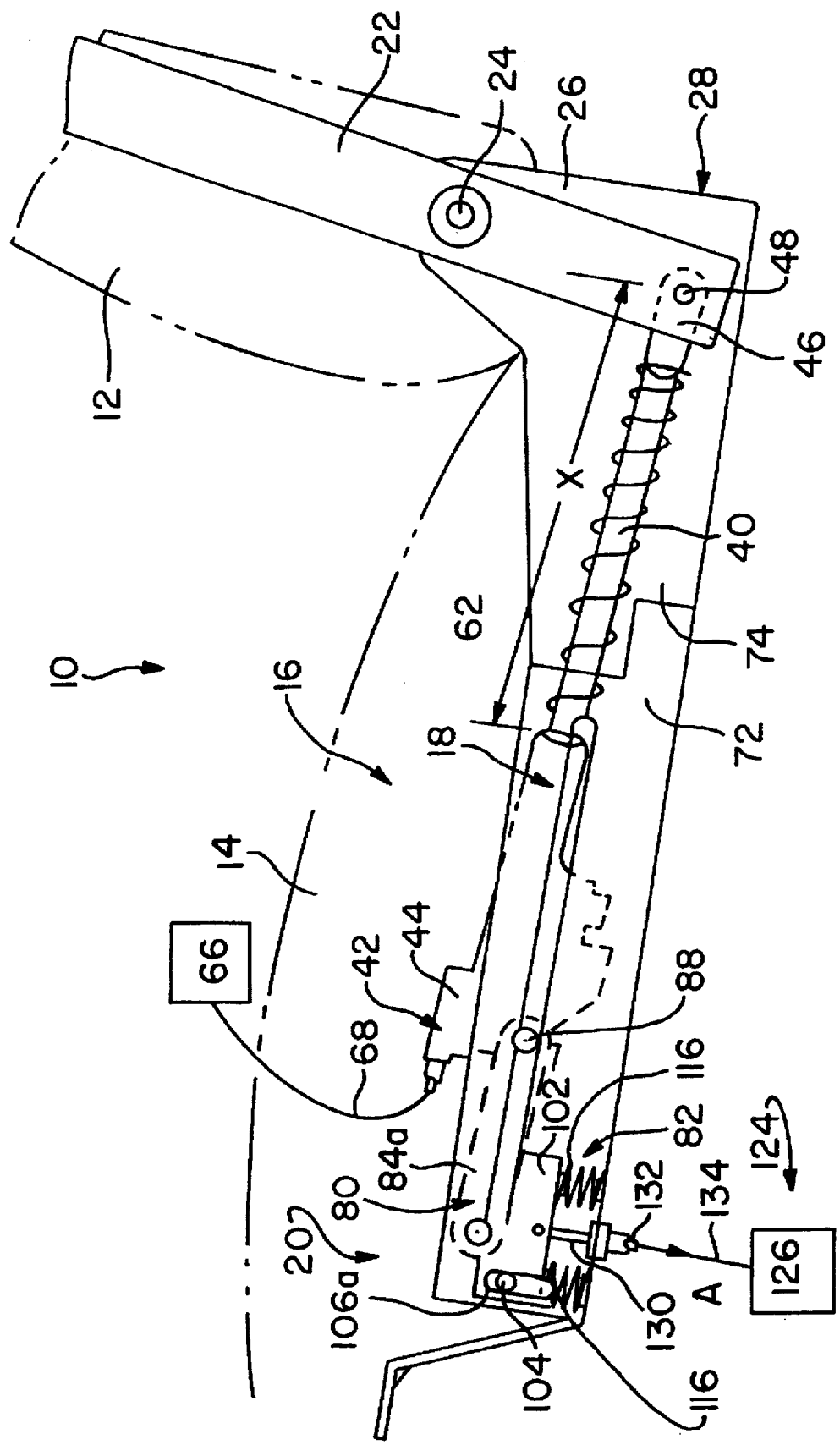
FIG. 3 is a side view showing the seat recliner installed in a seat assembly with the seatback in its upright position.
Figure 4:
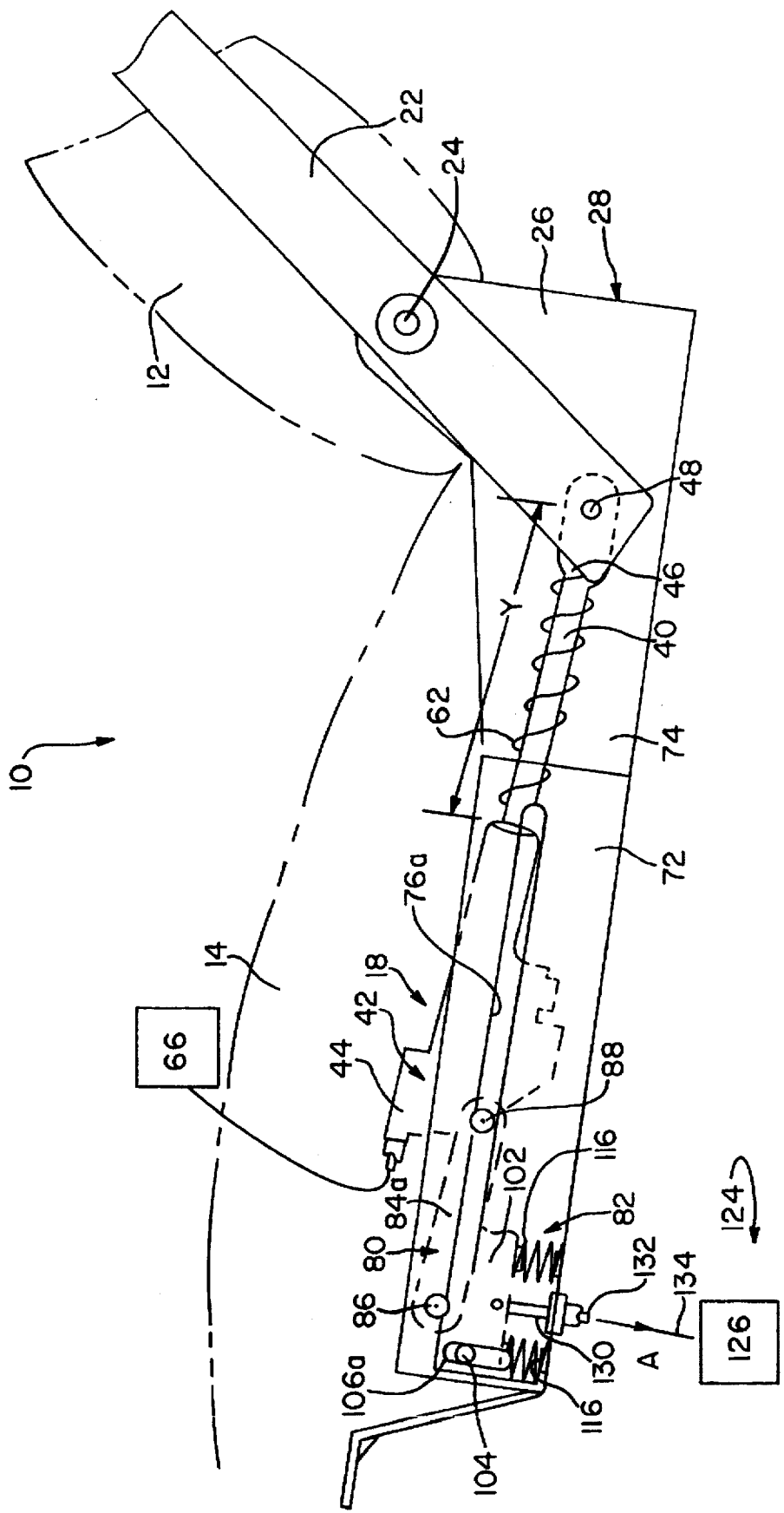
FIG. 4 is a side view, similar to FIG. 3, showing the seatback in its fully reclined position.

With reference to the drawings, a seat assembly 10 is shown to include a seatback 12, a seat bottom 14, and a seat recliner 16 interconnecting seatback 12 to seat bottom 14 for rearward (i.e., "reclining") and forward (i.e., "dumping") angular movement relative thereto. Seat recliner 16 includes a linear recliner mechanism 18 that is normally operable in a "locked" mode for holding seatback 12 in a desired reclined position. When it is desired to adjust the angular position of seatback 12, linear recliner mechanism 18 is selectively shifted into a "released" mode for permitting adjustment of the reclined position of seatback 12 between an upright position (FIG. 3) and a fully-reclined position (FIG. 4).

Seat recliner 16 further includes a dump mechanism 20 that is operable for permitting the seat occupant to move seatback 12 from any reclined position to its forwardly dumped position (FIG. 5) and then subsequently return seatback 12 to its previous reclined position without shifting linear recliner mechanism 18 into its released mode. Generally speaking, dump mechanism 20 is adapted to selectively permit fore and aft movement of linear recliner mechanism 18 relative to seat bottom 14 which, in turn, permits angular movement of seatback 12 between its reclined position and its dumped position. In particular, dump mechanism 20 is normally operable in a "latched" mode for retaining linear recliner mechanism 18 in a predefined first or "memory" position with respect to seat bottom 14. With linear recliner mechanism 18 located in its memory position, the seat occupant can selectively adjust the reclined position of seatback 12. However, when it is desired to dump seatback 12, dump mechanism 20 is selectively shifted into an "unlatched" mode for releasing linear recliner mechanism 18 such that subsequent forward angular movement of seatback 12 toward its dumped position causes rearward sliding movement of linear recliner mechanism 18 relative to seat bottom 14 from its memory position to a second or "free" position. Upon return of seatback 12 from its dumped position, linear recliner mechanism 18 is slid forwardly from its free position to its memory position whereat dump mechanism 20 is automatically shifted into its latched mode, whereby linear recliner mechanism 18 is again retained in its memory position with seatback 12 located in its previous reclined position.

Seatback 12 has an underlying frame structure which includes a pair of laterally-spaced side rails 22, one of which is shown. Each side rail 22 is attached by a hinge pin 24 to an upstanding flange segment 26 formed on a pivot bracket 28 that, in turn, is adapted to be mounted to the frame structure of seat bottom 14. Alternatively, pivot bracket 28 can be mounted to the sliding upper rail in seat assemblies equipped with a seat slide device. As best seen from FIG. 2, hinge pin 24 includes a non-threaded segment 30 journally supported in a bore 32 formed through side rail 22 and a bore 34 formed through flange segment 26. A threaded retainer 36 is provided for receiving a threaded segment 38 of hinge pin 24 for pivotally securing side rail 22 to flange segment 26. As noted, a similar pivot arrangement is provided between the opposite lateral edges of seatback 12 and seat bottom 14.

Linear recliner mechanism 18 is shown to include a recliner rod 40 that is supported for linear sliding movement relative to a recliner latch assembly 42 retained within a housing 44. In particular, a first end (not shown) of recliner rod 40 is retained within housing 44 for movement relative to recliner latch assembly 42 while its second end 46 is pivotably attached by a hinge pin 48 to bifurcated end 50 of seatback side rail 22. A non-threaded segment 52 of hinge pin 48 is inserted through aligned bores 54 in bifurcated end 50 of side rail 22 and a bore 56 formed through second end 46 of recliner rod 40. A threaded segment 58 of hinge pin 48 is received in a threaded retainer 60. In addition, a recliner spring 62 surrounds recliner rod 40 for normally biasing it toward an extended position relative to housing 44. With linear recliner mechanism 18 in its released mode, rearward pressure applied to seatback 12 causes seatback 12 to recline which, in turn, causes recliner rod 40 to move toward housing 44, thereby compressing recliner spring 62. As such, recliner spring 62 acts to normally bias seatback 12 toward its upright position so that seatback 12 can be returned to its upright position without the need for the seat occupant to pull forward on seatback 12.

While not specifically shown, it is contemplated that a latching element associated with recliner latch assembly 42 is adapted to selectively engage the first end of recliner rod 40. Thus, when linear recliner mechanism 18 is operating in its locked mode, the latching element of recliner latch assembly 42 lockingly engages recliner rod 40 so as to inhibit movement thereof relative to housing 44. When recliner rod 40 is prevented from moving, seatback 12 is likewise prevented from pivoting about hinge pins 24, thereby holding seatback 12 in the desired reclined position. In contrast, when linear recliner mechanism 18 is operating in its released mode, the latching element of recliner latch assembly 42 releases recliner rod 40 for permitting fore and aft sliding movement thereof relative to housing 44, thereby causing concurrent reclining movement of seatback 12 about hinge pins 24. As is conventional, linear recliner mechanism 18 would be equipped with a mechanism for limiting the extent of fore/aft movement of recliner rod 40 relative to housing 44 for positively establishing the limits of reclining movement of seatback 12 between its upright and fully-reclined positions. A particular construction for latch assembly 42 of linear recliner mechanism 18 is not critical to the present invention, since the principle features of novelty are directed to utilization of dump mechanism 20 with any suitable linear recliner for use in seat recliner 16. Thus, virtually any known linear-type seat recliner can be adapted for use with the present invention, with such linear-type seat recliners considered to be equivalent to the structure disclosed.

To provide means for controlling actuation of recliner latch assembly 42 for establishing the locked and released modes of linear recliner mechanism 18, seat recliner 16 includes a recline actuator mechanism 64. According to the particular embodiment shown, recline actuator mechanism 64 includes an operator, schematically shown by block 66, that is connected to the latching element of recliner latch assembly 42 via a suitable coupling, such as a bowden cable assembly 68. As will be appreciated by those skilled in the art, operator 66 may be a manually-operable handle or a power-operated device which, under the control of the seat occupant, causes linear recliner mechanism 18 to shift from its locked mode into its released mode. As is also conventional, recliner latch assembly 42 includes an arrangement for normally maintaining linear recliner mechanism 18 in its locked mode. As such, intentional and deliberate manipulation of operator 66 is required to permit reclining movement of seatback 12 relative to seat bottom 14.

Figure 1:
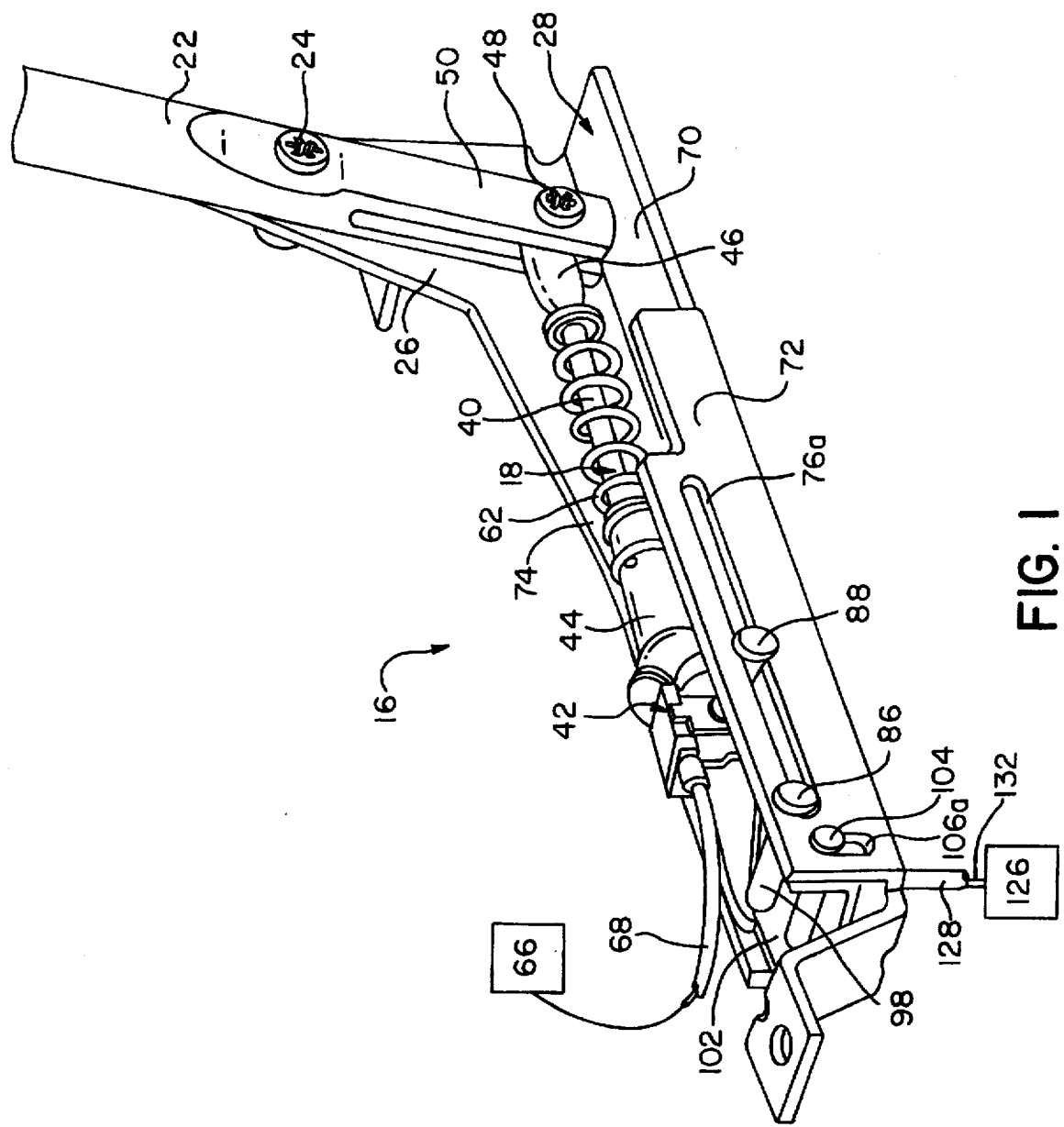
FIG. 1 is a perspective view of the seat recliner according to the preferred embodiment of the present invention.

In accordance with the present invention, dump mechanism 20 includes means for permitting selective sliding movement of linear recliner mechanism 18 relative to pivot bracket 28 for permitting dumping movement of seatback 12. In particular, pivot bracket 28 includes a base segment 70 from which a pair of laterally-spaced, vertical sidewalls 72 and 74 extend. A pair of commonly aligned, horizontally-extending guide slots 76a and 76b are respectively formed in sidewalls 72 and 74. In addition, transverse locking slots 78a and 78b are respectively formed at the front end of guide slots 76a and 76b. Dump mechanism 20 also includes a carriage assembly 80 that is connected to housing 44 of linear recliner mechanism 18 and which is supported for sliding movement between guide slots 76a and 76b in pivot bracket 28. Dump mechanism 20 further includes a dump latch assembly 82 that is supported on pivot bracket 28 for movement between a first position and a second position. With dump latch assembly 82 in its first position, carriage assembly 80 is releasably latched to pivot bracket 28 for locating linear recliner mechanism 18 at its predefined memory position (FIGS. 1 and 3) relative to pivot bracket 28 and seat bottom 14, thereby establishing the latched mode for dump mechanism 20. With dump latch assembly 82 in its second position, carriage assembly 80 is released from latched engagement to pivot bracket 28 for permitting rearward sliding movement of linear recliner mechanism 18 from its memory position toward its free position. As will be detailed, dump mechanism 20 also includes a biasing arrangement for normally biasing dump latch assembly 82 toward its first position.

Figure 2:
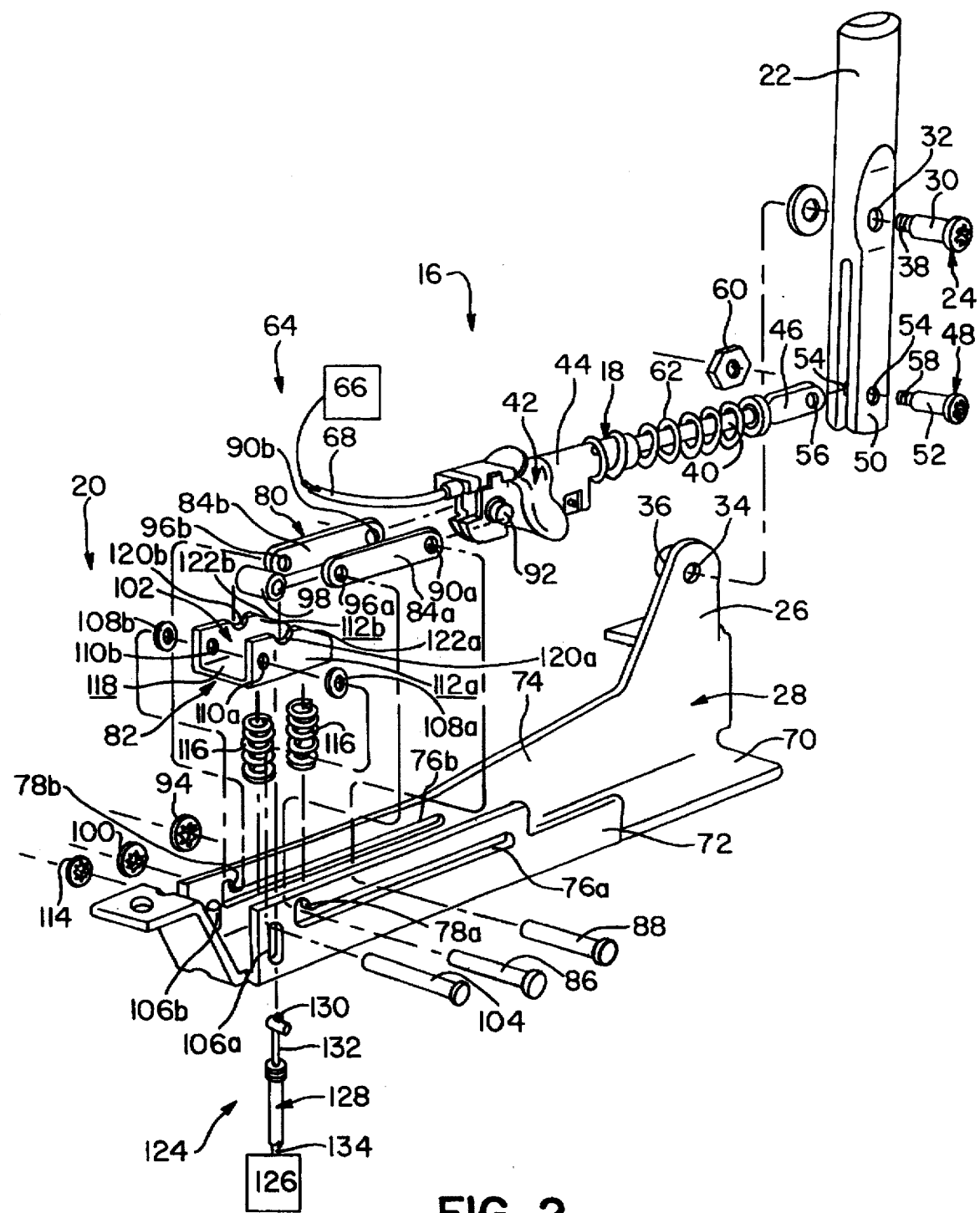
FIG. 2 is an exploded perspective view of the seat recliner shown in FIG. 1.

As best seen from FIG. 2, carriage assembly 80 includes a pair of carriage links 84a and 84b that are slidably disposed between guide slots 76a and 76b, respectively, by a front carriage pin 86 and a rear carriage pin 88. Rear carriage pin 88 is adapted to extend through guide slot 76a, an aperture 90a formed in carriage link 84a, a tubular sleeve portion 92 of housing 44, an aperture 90b formed in carriage link 84b, and guide slot 76b. A fastener 94 is secured to rear carriage pin 88 so as to be located adjacent to the outboard edge of sidewall 74. Sleeve portion 92 of housing 44 is journally supported on rear carriage pin 88 so as to permit housing 44 to pivot thereon as required during angular movement of seatback 12 about hinge pins 24. In a similar manner, front carriage pin 86 is adapted to extend through guide slot 76a, an aperture 96a formed in carriage link 84a, a roller sleeve 98, an aperture 96b formed in carriage link 84b, and guide slot 76b. A fastener 100 is secured to front carriage pin 86 and is located adjacent to the outboard surface of sidewall 74. Thus, linear recliner mechanism 18 is supported for sliding movement with carriage assembly 80 relative to pivot bracket 28.

Dump latch assembly 82 is shown to include a U-shaped latch bracket 102 supported for vertical bi-directional movement relative to pivot bracket 28. In particular, a pin 104 extends through a vertical guide slot 106a formed in sidewall 72, a first washer 108a, a bore 110a formed in a vertical wall segment 112a of latch bracket 102, a bore 110b formed in a vertical wall segment 112b of latch bracket 102, a second washer 108b, and a vertical guide slot 106b formed in sidewall 74. A fastener 114 is secured to pin 104 adjacent to the outboard surface of sidewall 74. Washers 108a and 108b are located between the sidewalls of pivot bracket 28 and the wall segments of latch bracket 102. Dump latch assembly 82 is further shown to include a biasing mechanism, such as coil springs 116, disposed between base segment 70 of pivot bracket 28 and a base segment 118 of latch bracket 102 for normally biasing latch bracket 102 upwardly toward its first position. Coil springs 116 are preferably mounted on post-like spring retainers provided on base segment 118 of latch bracket 102 and on base segment 70 of pivot bracket 28. As best seen in FIG. 2, wall segments 112a and 112b of latch bracket 102 include locking detents 120a and 120b and cam surfaces 122a and 122b.

To provide means for moving latch bracket 102 from its first position (FIGS. 1, 3 and 4) to its second position (FIG. 5), seat recliner 16 further includes a dump actuator mechanism 124. In particular, dump actuator mechanism 124 is shown to include an operator, schematically shown by block 126, that is connected to latch bracket 102 by a coupling, such as by a bowden cable assembly 128. In the particular embodiment shown, a first end 130 of an inner cable 132 is mounted to latch bracket 102 while its second end 134 is interconnected to dump operator 126. When cable 132 is pulled in the direction of arrow A, as shown in FIG. 3, due to actuation of dump operator 126, dump latch assembly 82 is shifted from its first position into its second position in opposition to the biasing of coil springs 116, thereby causing dump mechanism 20 to be shifted from its latched mode into its unlatched mode. When dump mechanism 20 is in its latched mode, latch bracket 102 is located in its first position with roller sleeve 98 and/or front carriage pin 86 retained within lock detents 120a and 120b. In addition, the biasing of coil springs 116 causes front carriage pin 86 to be forcibly urged upwardly until front carriage pin 86 is biased into retention within locking slots 78a and 78b, thereby latching carriage assembly 80 to pivot bracket 28 and locating linear recliner mechanism 20 in its memory position. Thus, dump operator 126 must be actuated to move latch bracket 102 downwardly against the biasing of springs 116 to its second position whereat front carriage pin 86 is released from locking slots 78a and 78b.

The operation of seat recliner 16 will now be described. In FIG. 3, seatback 12 is located in the upright position and recliner rod 40 extends a distance "X" from housing 44. When it is desired to adjust the reclination of seatback 12 to another position, such as the fully-reclined position of FIG. 4, recliner operator 66 is actuated by the seat occupant for shifting linear recliner mechanism 18 into its released mode. Rearward angular movement of seatback 12 to its fully-reclined position is then permitted and recliner rod 40 now extends a shorter distance "Y" from housing 44. Preferably, the reclined position of seatback 12 can be adjusted, either continuously or sequentially, between the limits defined by its upright and fully-reclined positions. Following location of seatback 12 in the desired reclined position, operator 66 is released for automatically shifting linear recliner mechanism 18 back into its locked mode. As seen in FIGS. 3 and 4, linear recliner mechanism 18 is held in its memory position relative to pivot bracket 28 during adjustment of the seatback reclination.

Figure 5:
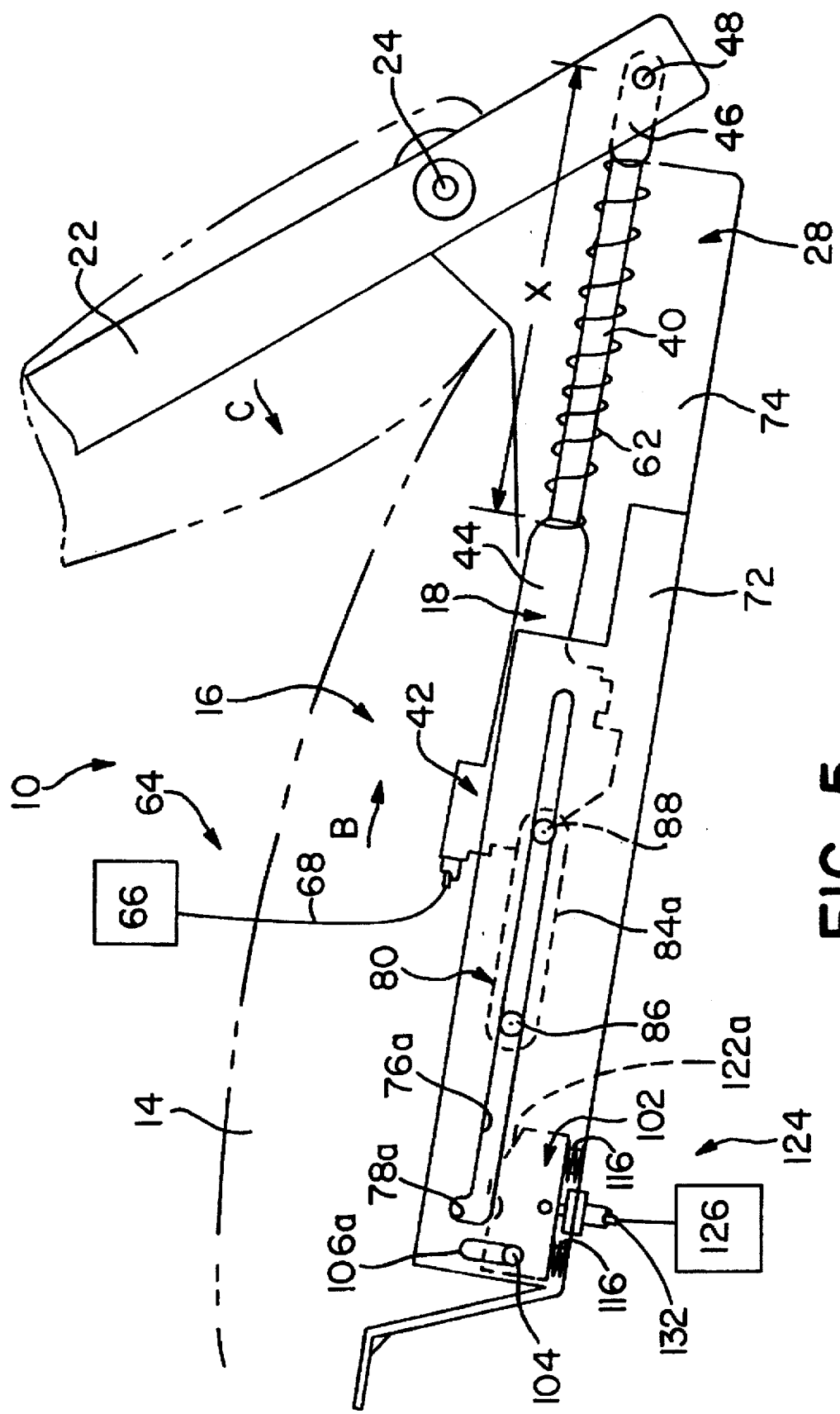
FIG. 5 is another side view showing the seatback in its forwardly dumped position.

When access to the rear seat area of the vehicle's passenger compartment is desired, operator 126 of dump actuator mechanism 124 can be actuated to pull latch bracket 102 to its second position, as shown in FIG. 5, wherein springs 116 are compressed. As noted, front carriage pin 86 is thus permitted to move out of locking slots 78a and 78b such that carriage links 84a and 84b are free to slide rearwardly in the direction of arrow B within guide slots 76a and 76b. With carriage assembly 80 released from latched engagement to pivot bracket 28, seatback 12 can be forwardly pivoted to its dumped position in the direction of arrow C which, in turn, causes linear retractor mechanism 18 to slide rearwardly from its memory position to its free position. Assuming seatback 12 was located in its upright position prior to actuation of dump operator 126, it can be seen that the distance that recliner rod 40 extends from housing 44 is maintained at the distance "X" during forward dumping movement of seatback 12. Thereafter, when seatback 12 is returned to the upright position, linear recliner mechanism 18 is slid forwardly toward its memory position. As such, roller sleeve 98 and/or front carriage pin 86 engage cam surfaces 122a and 122b of latch bracket 102 which, due to springs 116, has been returned to its first position. Such camming action forces latch bracket 102 initially in a downward direction so that roller sleeve 98 and front carriage pin 86 are received in lock detents 120a and 120b. Springs 116 then bias latch brackets 102 to its first position, thus locking carriage assembly 80 and linear recliner mechanism 18 to pivot bracket 28. Because recliner rod 40 is maintained at distance "X" throughout sliding movement of linear recliner mechanism 18, the seatback memory feature is obtained and seatback 12 is automatically returned to its previously selected position. By way of further example, if seatback 12 was in its fully-reclined position prior to forward dumping thereof, linear recliner mechanism 18 would be maintained at its "Y" recliner rod distance during its sliding movement on pivot bracket 28, thereby resetting seatback 12 in its fully-reclined position upon return from the dumped position.

A similar seat recliner to seat recliner 16 can be mounted at the opposite side of seat assembly 10 if desired with recliner operator 66 and dump operator 126 suitably connected thereto to facilitate synchronized reclining and dumping movement of seatback 12. Seat recliner 16 can also be adapted for use with seat assemblies having a seat slide device for causing coordinated forward sliding movement of seat assembly 10 with dumping of seatback 12 to provide still greater access to the rear seat area. Finally, it is contemplated that carriage assembly 80 could be eliminated and linear recliner mechanism 18 mounted directly to pivot bracket 28 for sliding movement relative thereto with dump latch assembly 82 operable to act directly on linear recliner mechanism 18.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat recliner for angularly moving a seatback relative to a seat bottom, said seat recliner comprising:

a linear recliner mechanism adapted to be interconnected between the seatback and the seat bottom, said linear recliner mechanism is normally operable in a locked mode to retain the seatback in a reclined position relative to the seat bottom anti which can be selectively shifted into a released mode to permit adjustment of the reclined position of the seatback/and a dump mechanism adapted to slidably connect said linear recliner mechanism to the seat bottom for movement between a first position and a second position, said dump mechanism is operable in a latched mode to hold said linear recliner mechanism in said first position whereat said linear recliner mechanism can be selectively actuated to adjust the recliner position of the seatback, and said dump mechanism is operable in an unlatched mode for permitting movement of said linear recliner mechanism to said second position while said linear recliner mechanism is maintained in its locked mode which results in movement of the seatback from its reclined position to a forward dumped position.

2. The seat recliner of claim 1 wherein said dump mechanism includes a bracket adapted to be secured to the seat bottom and on which said linear recliner mechanism is supported for movement between said first and second positions, a dump latch assembly normally operable in said latched mode for holding said linear recliner mechanism in said first position and which is operable in said unlatched mode to release said linear recliner mechanism for movement toward said second position, and a dump actuator for selectively shifting said dump latch assembly from its latched mode into its unlatched mode.

3. The seat recliner of claim 1 wherein said dump latch assembly includes a latch member supported from said bracket for movement between a first position and a second position, and a biasing mechanism for biasing said latch member toward its first position, said latch member operable in its first position to establish said latched mode and in its second position to establish said unlatched mode, said dump actuator connected to said latch member for moving said latch member to its second position in opposition to said biasing mechanism.

4. The seat recliner of claim 1 wherein said dump mechanism is normally operable in its latched mode for retaining said linear recliner mechanism in said first position with respect to the seat bottom such that a seat occupant can selectively adjust the reclined position of the seatback by selectively shifting said linear recliner mechanism into its released mode, and wherein said dump mechanism is selectively operable in its unlatched mode for releasing said linear recliner mechanism such that subsequent angular movement of the seatback towards its dumped position causes movement of said linear recliner mechanism relative to the seat bottom from said first position to said second position.

5. The seat recliner of claim 4 wherein movement of the seatback from its dumped position causes said linear recliner mechanism to move from its second position to its first position whereat said dump mechanism automatically is shifted into its latched mode for retaining said linear recliner mechanism in said first position and thereby locating the seatback in its previously reclined position.

6. The seat recliner of claim 4 further comprising a dump actuator for selectively shifting said dump mechanism from its latched mode into its unlatched mode.

7. The seat recliner of claim 1 wherein said linear recliner mechanism includes a housing adapted to be coupled to the seat bottom for selective movement from said first position to said second position, a recliner rod having a first end supported by said housing and a second end adapted to be coupled to the seatback, a recliner latch assembly normally operable in a locked mode for inhibiting movement of said recliner rod relative to said housing for holding the seatback in a desired reclined position, said recliner latch assembly is further operable in a released mode for permitting movement of said recliner rod relative to said housing for adjusting the reclined position of the seatback, and a recline actuator for permitting said recliner latch assembly to be selectively shifted from its locked mode into its released mode.

8. A seat recliner for use in a seat assembly having a seatback supported for pivotal movement relative to a seat bottom, said seat recliner comprising:

a linear recliner mechanism operable for adjusting the reclined position of the seatback, said linear recliner mechanism including a housing, a recliner rod having a first end supported by said housing and a second end adapted to be coupled to the seatback, a recliner latch assembly normally operable in a locked mode for inhibiting movement of said recliner rod relative to said housing for holding the seatback in a desired reclined position, said recliner latch assembly further operable in a released mode for permitting movement of said recliner rod relative to said housing for adjusting the reclined position of the seatback, and a recline actuator for permitting said recliner latch assembly to be selectively shifted from its locked mode into its released mode; and a dump mechanism operable for moving the seatback between its reclined position and a forwardly dumped position, said dump mechanism including a bracket adapted to be secured to the seat bottom and on which said housing is supported for sliding movement of said linear recliner mechanism between a first position and a second position, a dump latch assembly normally operable in a latched mode for latching said linear recliner mechanism in said first position and in an unlatched mode for permitting movement of said linear recliner mechanism between said first and second positions in response to movement of the seatback between its reclined and dumped positions with said recliner latch assembly maintained in its locked mode, and a dump actuator for permitting said dump latch assembly to be selectively shifted from its latched mode into its unlatched mode.

9. The seat recliner of claim 8 wherein said dump latch assembly is normally operable in its latched mode for retaining said linear recliner mechanism in said first position with respect to the seat bottom whereat a seat occupant can selectively adjust the reclined position of the seatback by selectively shifting said recliner latch assembly into its released mode, and wherein said dump latch assembly is operable in its unlatched mode for releasing said recliner latch assembly such that subsequent angular movement of said seatback towards its dumped position causes sliding movement of said linear recliner mechanism relative to said bracket from its first position to its second position.

10. The seat recliner of claim 9 wherein movement of the seatback from its dumped position toward its previously reclined position causes said linear recliner mechanism to slide from its second position to its first position whereat said dump latch assembly is automatically shifted into its latched mode for retaining said linear recliner mechanism in said first position and thereby retaining the seatback in its previously reclined position.

11. The seat recliner of claim 8 wherein said bracket includes a guide slot formed therein, and said dump mechanism further includes means for retaining said housing in said guide slot for movement between said first and second positions.

12. The seat recliner of claim 11 wherein said retaining means includes a pin extending through said housing and said guide slot.

13. The seat recliner of claim 8 wherein said dump latch assembly includes a latch member supported on said bracket for movement between first and second positions, and a biasing mechanism for biasing said latch member toward its first position, said latch member operable in its first position to establish said latched mode and in its second position to establish said unlatched mode, said dump actuator connected to said latch member for moving said latch member to its second position in opposition to said biasing mechanism.

14. A vehicle seat comprising:
a seat bottom;
a seatback supported for pivotal movement relative to said seat bottom;
a linear recliner mechanism operable for adjusting the reclined position of said seatback, said linear recliner mechanism including a housing, a recliner rod having a first end supported by said housing and a second end coupled to the seatback, a recliner latch assembly normally operable in a locked mode for inhibiting movement of said recliner rod relative to said housing for holding said seatback in a desired reclined position, and in a released mode for permitting movement of said recliner rod relative to said housing for adjusting the reclined position of said seatback, and a recline actuator for shifting said recliner latch assembly from said locked mode into said released mode; and a dump mechanism operable for moving said seatback between its reclined position and a forwardly dumped position, said dump mechanism including a bracket secured to said seat bottom with said housing supported on said bracket for moving said linear recliner mechanism between a first position and a second position, a dump latch assembly normally operable in a latched mode for latching said linear recliner mechanism in said first position, and in an unlatched mode for permitting movement of said linear recliner mechanism between said first and second positions in response to movement of the seatback between its reclined and dumped positions with said linear recliner mechanism maintained in its locked mode, and a dump actuator for shifting said dump latch assembly into said unlatched mode.

15. The vehicle seat of claim 14 wherein said dump mechanism is normally operable in said latched mode for retaining said linear recliner mechanism in said first position with respect to said seat bottom such that a seat occupant can selectively adjust the reclined position of said seatback by selectively shifting said linear recliner mechanism into said released mode, and wherein said dump mechanism is selectively operable in said unlatched mode for releasing said linear recliner mechanism such that subsequent angular movement of said seatback towards its dumped position causes movement of said linear recliner mechanism relative to said bracket from its first position to its second position.

16. The vehicle seat of claim 15 wherein movement of said seatback from its dumped position causes said linear recliner mechanism to move from its second position to its first position whereat said dump mechanism is automatically is shifted into said latched mode for retaining said linear recliner mechanism in said first position and thereby retain said seatback in its previously reclined position.

17. A seat assembly comprising:
a seat bottom;
a seatback supported for pivotal movement relative to said seat bottom;
a housing supported on said seat bottom for movement between a first position and a second position;
a recliner rod having a first end supported by said housing and a second end coupled to said seatback;
a recliner latch assembly normally operable in a locked mode for inhibiting movement of said recliner rod relative to said housing, said recliner latch assembly is further operable in a released mode for permitting movement of said recliner rod relative to said housing;
a recline actuator for permitting said recliner latch assembly to be selectively shifted from its locked mode into its released mode;
a dump latch assembly normally operable in a latched mode for latching said housing in said first position whereat said recline actuator can be actuated to shift said recliner latch assembly into its released mode to adjust the reclined position of said seatback, and said dump latch assembly is operable in an unlatched mode for permitting movement of said housing from said first to said second positions while said recliner latch assembly is maintained in its locked mode which results in movement of said seatback from its reclined position to a forward dumped position; and
a dump actuator for permitting said dump latch assembly to be selectively shifted from its latched mode into its unlatched mode.

18. The seat assembly of claim 17 wherein said seat bottom includes a guide slot and said housing is coupled to said guide slot for sliding movement between said first and second positions.

19. The seat assembly of claim 17 wherein movement of said seatback from its dumped position toward its last reclined position causes said housing to move from said second position to said first position whereat said dump latch assembly is automatically shifted into its latched mode for retaining said housing in said first position and thereby retaining said seatback in its last reclined position.

20. The seat assembly of claim 17 wherein said dump latch assembly includes a latch member supported on said seat bottom for movement between first and second positions, and a biasing mechanism for biasing said latch member toward said first position, said latch member operable in its first position to establish said latched mode and in its second position to establish said unlatched mode, said dump actuator connected to said latch member for moving said latch member to its second position in opposition to said biasing mechanism.

* * * * *